June 11, 1940.                J. E. HOGUE                2,204,495
                METHOD OF FORMING FROZEN CONFECTIONS
            Original Filed May 2, 1932    3 Sheets-Sheet 1
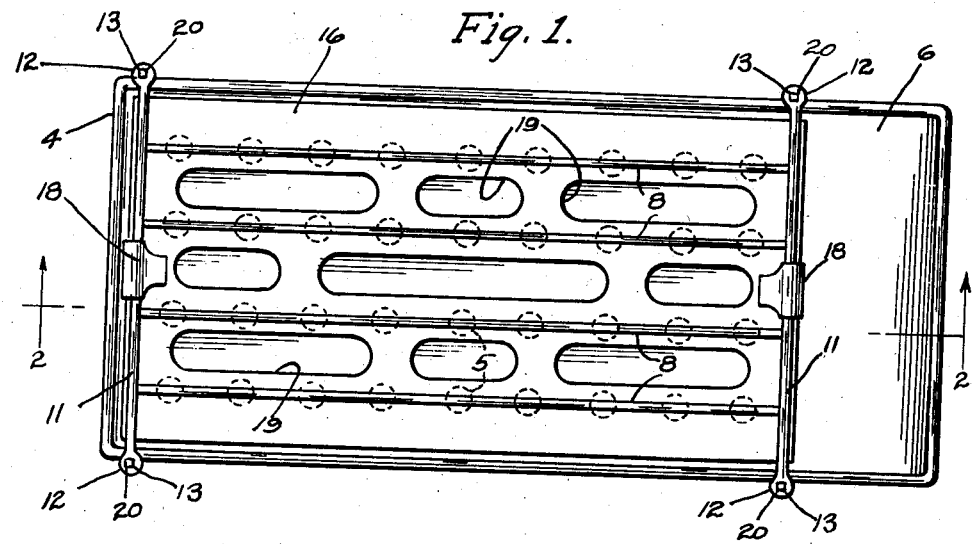
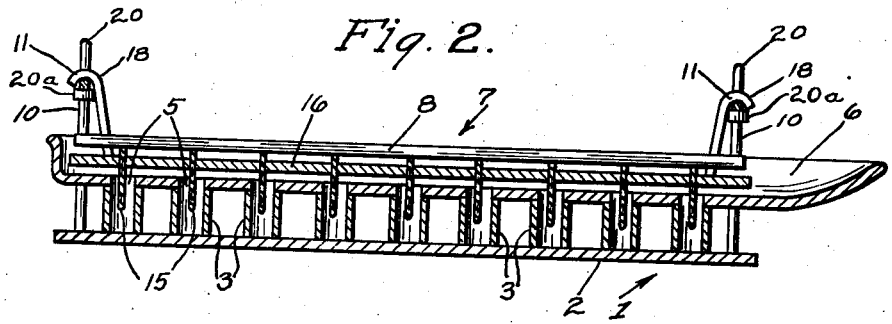
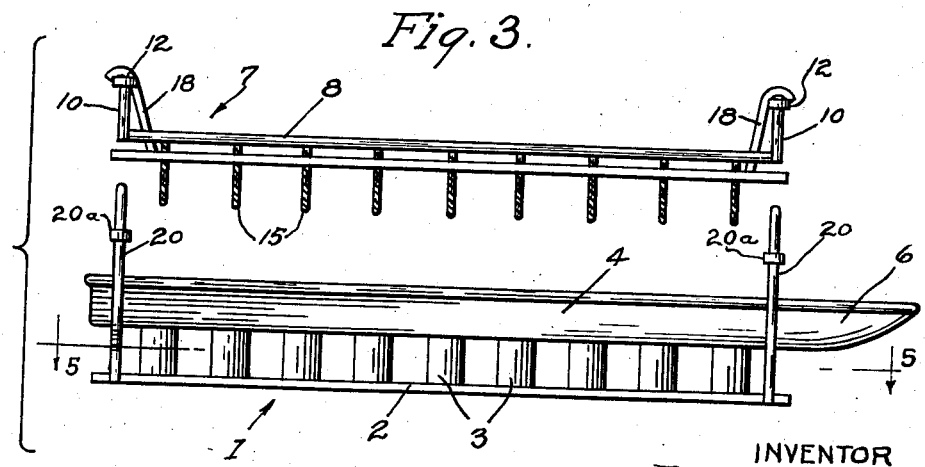
INVENTOR
James Earl Hogue
BY
ATTORNEY June 11, 1940.  J. E. HOGUE  2,204,495
METHOD OF FORMING FROZEN CONFECTIONS
Original Filed May 2, 1932  3 Sheets-Sheet 2
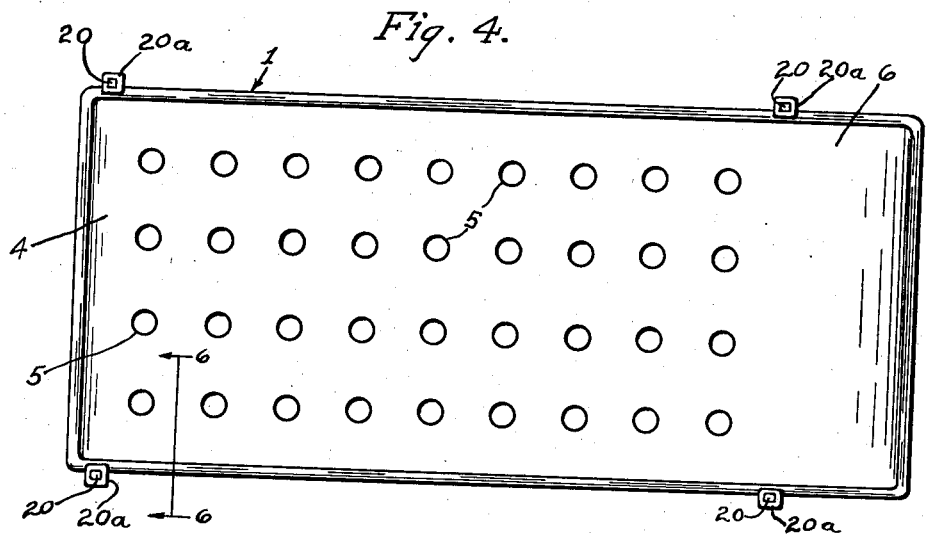
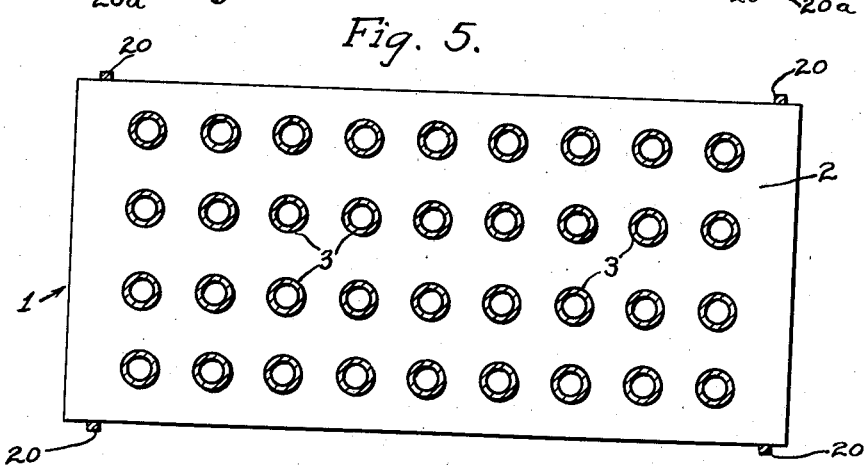
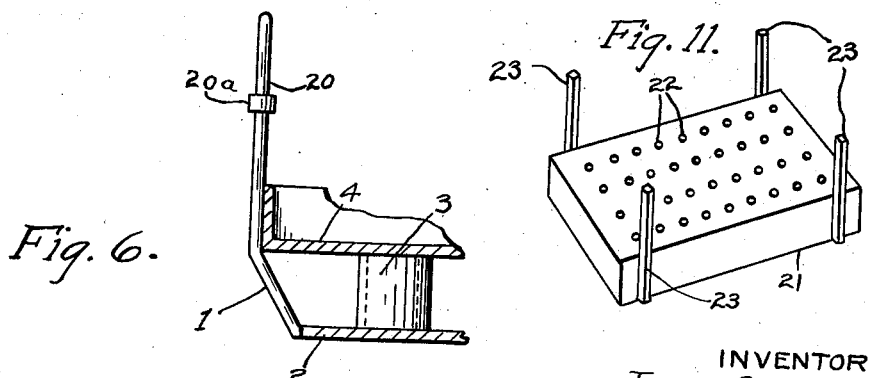
INVENTOR
James Earl Hogue
BY
ATTORNEY

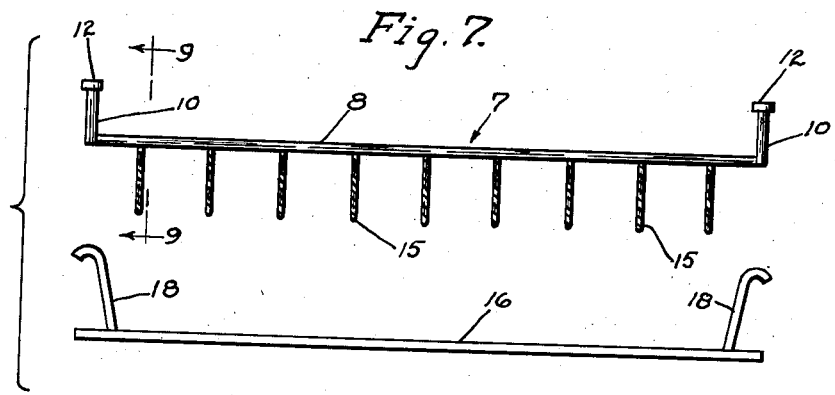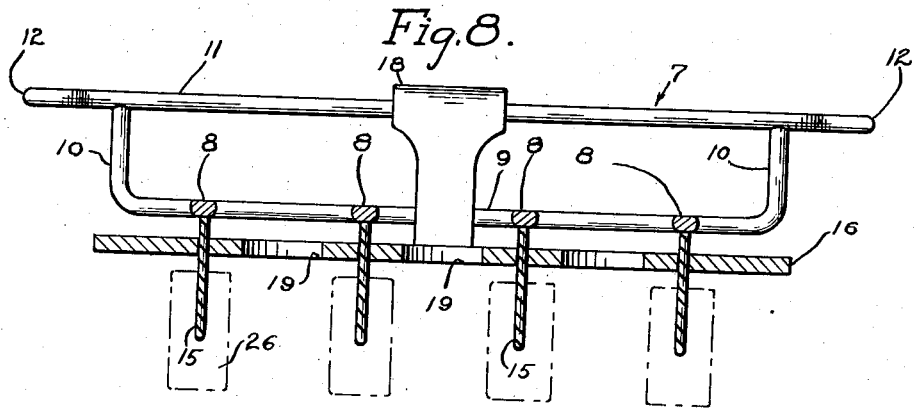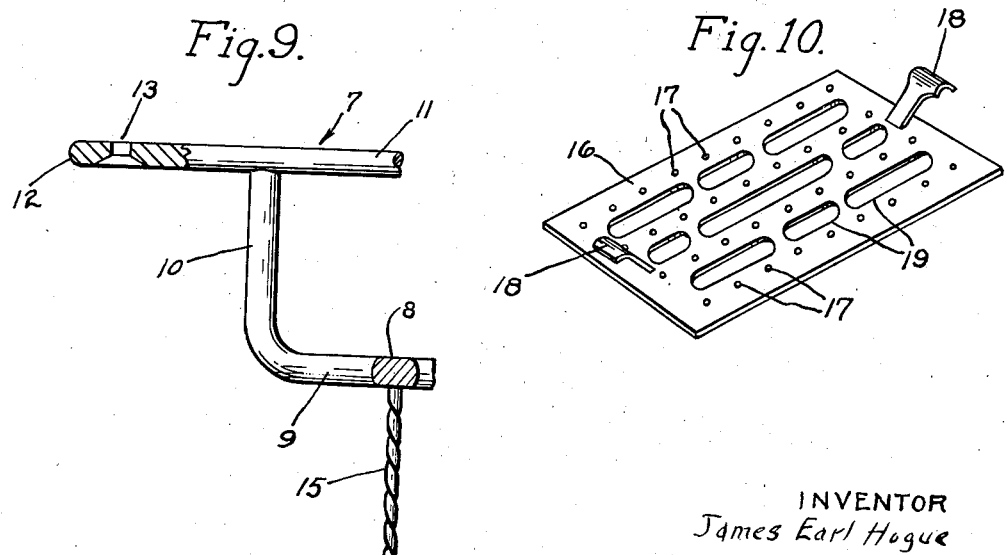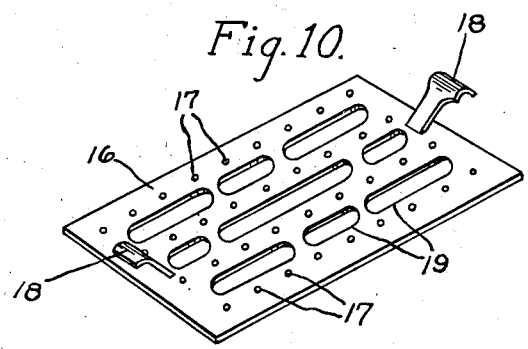

Patented June 11, 1940

2,204,495

UNITED STATES PATENT OFFICE 2,204,495

METHOD OF FORMING FROZEN CONFECTIONS

James E. Hogue, Hot Springs, Ark., assignor to Joe Lowe

Original application May 2, 1932, Serial No. 608,808. Divided and this application April 5, 1933, Serial No. 664,584

12 Claims. (Cl. 107—54)

The present invention is a division of my copending application S. N. 608,808, filed May 2, 1932, and relates to the method of forming frozen confection or novelties and particularly such novelties which are dispensed as individual services.

One of the objects of the present invention is to provide an improved method of forming such confection which method is practiced by bonding an insert in the confection, preferably while the confection is being solidified, and utilizing the insert for withdrawing the confection from the mold, in which it is solidified, after the bond between the confection and the mold is broken.

Another object of the invention is to utilize a stripper, which is arranged to engage the confection, for stripping the confection off of the confection-withdrawing-insert.

A further object is to utilize the withdrawing-insert for manipulating or holding the frozen confection while a coating, such as chocolate, is being applied to the confection.

A still further object is to provide an improved method of forming individually contained or wrapped frozen confection which method is practiced by utilizing the mechanism, which is used for withdrawing the frozen confection, from the mold, for supporting the confections in receiving relation with individual containers or wrappers.

The foregoing and other objects and advantages of the present invention will be apparent from the following detail description, when read in connection with the accompanying drawings, which show a preferred embodiment of the invention, in which:

Figure 1 is a view in top plan of a portion of the apparatus.

Figure 2 is a vertical longitudinal section, taken substantially on the line 2—2 of Figure 1.

Figure 3 is a view in side elevation showing the mold and carrier separated.

Figure 4 is a view in top plan of the mold.

Figure 5 is a view in horizontal section, taken substantially on the line 5—5 of Figure 3.

Figure 6 is a fragmentary view in vertical transverse section through the mold, taken substantially on the line 6—6 of Figure 4.

Figure 7 is a view in side elevation of the carrier and the stripper, showing said carrier and stripper separated.

Figure 8 is a view in vertical transverse section through the carrier.

Figure 9 is a fragmentary view in vertical transverse section, taken substantially on the line 9—9 of Figure 7.

Figure 10 is a detail view in perspective of the stripper.

Figure 11 is a view showing the container rack.

Referring now to the drawings in detail, it will be seen that the embodiment of the present invention which has been illustrated comprises a mold structure which is designated generally by the reference numeral 1, said mold structure including a base 2, upon which are fixed and from which rise a plurality of cells or molds in the form of tubes 3, the bottoms of which are formed by said base 2. Fixed on the upper ends of the tubes 3 is a pan 4 having communication with said tubes through openings 5 in the bottom of the pan. The pan 4 is provided with a sweep end 6 to facilitate disposing of excess material after the bowl chambers provided by the tubes 3 have been filled.

A carrier is designated generally by the reference numeral 7 and includes the spaced, parallel longitudinal bars 8 which are connected, at their ends, to the head bars 9 having upturned end portions 10 to which the handle bars 11 are fixed. The handle bars 11 project beyond the head bars 9 and terminate in enlargements 12 having openings 13 therein which merge with concavities 14 in the lower sides of said enlargements 12. The purpose of the openings 13 and concavities 14 will be presently set forth.

A plurality of inserts, herein shown as spirally twisted or corrugated pins or rods 15, are fixed to the longitudinal bars 8 of the carrier 7. The pins 15 are spaced on the bars 8 so that each extends into one of the molds 3, in the manner illustrated to advantage in Fig. 2.

Slidable vertically on the depending pins 15 of the carrier 7 is a stripper 16 having holes 17 therein which receive said pins 15. Rising from the ends of the stripper 16 are the resilient latches 18 which are engageable with the handle bars 11 for releasably supporting the stripper in raised position. The latches 18 further are engageable with the head bars 9 for limiting the downward movement of said stripper on the pins 15. The stripper 16 is further provided with the elongated openings 19 through which the operator may observe the mold 1 and the container rack to be presently described when the device is in use. The openings 19 also assure lighter weight than would be the case if said openings were omitted.

Rising from the corner portions of the mold structure 1 are ports 20, said posts being secured to the mold in any suitable manner, as by welding or soldering. The posts 20 are engaged in the openings 13 of the handle bars 11 when the carrier 7 is mounted on the mold 1, thus providing means for centering the pins 15 in the mold chambers and preventing lateral or horizontal movement of the carrier when lifting the frozen confection out of the mold chambers. In other words, the carrier 7 can be moved only in a true vertical plane when removing the frozen confection from the mold until after said confection has cleared the mold chambers. Stops 20a are provided on the posts 20 and engage the enlargements 12 of handle bars 11 to limit the downward movement of the frame 7 so that the stripper 16 is spaced from the bottom of the pan 4.

A container rack (Fig. 11) is designated by the reference numeral 21 and is provided with a plurality of wells or pockets 22 for the reception of the containers. The wells or pockets 22 correspond in number and spacing to the mold chambers and the pins 15. Rising from the corner portions of the rack 21 are the posts 23 which also are engageable in the openings 13 for centering the pins 15 over the containers in the wells or pockets 22 and for guiding the carrier 7 when lowering the confections into the containers. The concavities 14 constitute guide means for facilitating engagement of the posts 20 of the mold 1 and the posts 23 of the container rack 21 in the openings 13 of the carrier 7.

In use, the chambers of the mold 1 are filled with a substance to be frozen, such as ice cream mix by pouring said material from the mixer (not shown), into the pan 4. As previously stated, the sweep end 6 of the pan 4 facilitates the return of the excess material to the mixer. The carrier 7 with the stripper 16 in raised position thereon, is then mounted in the pan 4 with the posts 20 projecting upwardly through the openings 13 and the rods 15 depending centrally in the mold chambers. The ice cream mix is then frozen by any suitable means or method and the bond between the frozen confection and tubes is broken preferably by momentarily immersing the tubes in water to loosen the confection from the sides of the tubes. Then, the carrier 7 is lifted from the mold with the confection on the pins 15.

If coated confections, such as chocolate coated, are desired, the carrier 7 is used for holding or manipulating the confections while coating the same. Preferably the confections, carried by the pins 15 of the carrier 7, are momentarily dipped in a bath of warm chocolate. The chocolate on the confections soon hardens due to the refrigerating effect of the cold confections. The carrier is then mounted on the container rack 21 (Fig. 11), the posts 23 of said rack, as previously stated, being engaged in the openings 13. After the posts 23 are engaged in the openings 13, the carrier 7 is lowered to place the confections which are still on the pins 15 in the packaging containers which are positioned in the wells or pockets 22. After the confections have been lowered into the packaging containers, the latches 18 are disengaged from the handle bars 11, thus permitting the stripper 16 to fall by gravity from the pins 15 and come to rest on the tops of the containers. The carrier 7 is then lifted, at which time the stripper 16 will remove the confections from the rods 15, the weight of said stripper 16 being sufficient to accomplish this, or, if the weight of the stripper is not heavy enough for the purpose, the operator can push downwardly on the latches 18 while lifting the carrier 7. When the stripper 16 is near the lower ends of the pins 15, the latches 18 engage the head bars 9 of the carrier for arresting the downward movement of the stripper and thereby prevent the withdrawal of the pins 15 from the openings 17 in the stripper 16.

It will be noted (see Fig. 8) that the rods or pegs 15 fit snugly within the openings therefor in the stripper 16. Therefore, during each operation, the stripper will shear the pegs 15 clear of any material such as chocolate or ice cream tending to cling thereto. In this manner, chocolate and ice cream cannot accumulate on the pegs. It will also be noted that the pegs 15 are formed of small gauge material and are apt to be bent from normal through careless use of the apparatus. Should the pegs become bent, they can nevertheless be withdrawn from the blocks or confection without breaking the latter because, being formed of small gauge material, they can bend to conform with the tortuous opening formed by the bent peg. Also because being formed of small gauge material, they can straighten to their normal vertical positions when they are pulled through the stripper.

It is believed that the many advantages of a confection making apparatus constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

I claim:

1. Those steps in the method of producing packaged frozen confections which consist in withdrawing the confections from the molds, in which they were frozen, by means of inserts frozen in the confections, then supporting the confections by the inserts in receiving relation with containers, and then releasing the confections from the inserts whereby the confections are then each supported entirely by a container.

2. Those steps in the method of producing packaged frozen confections which consist in withdrawing the confections from the molds, in which they were frozen, by means of inserts frozen in the confections, then placing the confections in containers and utilizing the inserts for holding the confections while placing same in the containers, and then releasing the confections from the inserts whereby the confections are then each supported entirely by the container.

3. Those steps in the method of producing packaged frozen confections which consist in withdrawing the confections from the molds, in which they were frozen, by means of inserts frozen in the confections, placing the confections in receiving relation with open top containers and then lowering the confections into the containers, utilizing the inserts for holding the confections, and then releasing the confections from the inserts whereby the confections are then each supported entirely by a container.

4. Those steps in the method of harvesting individually frozen confections in groups, which consist in withdrawing the confections as a group from the individual molds in which they were frozen, by means of inserts frozen in the confections, and then separating all of the inserts from all of the confections in one single operation.

5. Those steps in the method of harvesting groups of coated frozen confections, which consist in withdrawing the individual confections as a group from the individual molds in which they were frozen, by means of inserts frozen in the confections, applying a coating to the confections, and then separating all of the inserts from all of the confections in one single operation.

6. The method of molding and handling individual frozen confections which consists in placing the confection material to be frozen in a plurality of mold cavities, placing a rod in each mold cavity so that the lower portion of the rod is immersed in the confection material, freezing the confection material whereby it becomes bonded to the rods and to the mold walls, breaking the bond between the mold walls and the confection material, simultaneously withdrawing all the rods with a molded confection congealed on each rod, and simultaneously exerting pressure on the tops of the confections for forcing them from the rods in a single operation.

7. The method of molding and handling individual frozen confections which consists in placing the confection material to be frozen in a plurality of mold cavities, placing a rod in each mold cavity so that the lower portion of the rod is immersed in the confection material, freezing the confection material whereby it becomes bonded to the rods and to the mold walls, breaking the bond between the mold walls and the confection material, simultaeously withdrawing all the rods with a molded confection congealed on each rod, and thereafter simultaneously breaking the bond between each of said molded confections and its associated rod preparatory to stripping all of said molded confections from said rods in a single operation.

8. The method of molding and handling individual coated frozen confections which consists in placing the confection material to be frozen in a plurality of mold cavities, placing a rod in each mold cavity so that the lower portion of the rod is immersed in the confection material, freezing the confection material whereby it becomes bonded to the rods and to the mold walls, breaking the bond between the mold walls and the confection material, simultaneously withdrawing all the rods with a molded confection congealed on each rod, simultanously dipping all of the molded confections in a coating material, and simultaneously exerting pressure on the tops of the coated confections for forcing them from the rods in a single operation.

9. The method of molding and handling individual coated frozen confections which consists in placing the confection material to be frozen in a plurality of mold cavities, placing a rod in each mold cavity so that the lower portion of the rod is immersed in the confection material, freezing the confection material whereby it becomes bonded to the rods and to the mold walls, breaking the bond between the mold walls and the confection material, simultaneously withdrawing all the rods with a molded confection congealed on each rod, simultaneousy coating all of the frozen confections with an edible coating, allowing said coatings to harden and set, and simultaneously stripping all of the frozen confections as thus coated from the said rods.

10. Those steps in the method of handling molded frozen confections, which consist in withdrawing all of the confections together upon inserts frozen in the confections from the cavities in which they were molded and frozen, holding the confections together in spaced relation by means of their respective inserts while coating the confections, and then separating all of the confections from all of the inserts in one single operation.

11. Those steps in the method of making frozen confections which consist in inserting a plurality of spaced rods in the confection material, bonding said rods to said confection material by refrigeration, finishing the frozen confections while still bonded to said rods, and then breaking the bond between the confections and their respective rods in one operation.

12. Those steps in the method of making frozen confections which consist in inserting a plurality of spaced rods in the molded confection material, bonding said rods to said confection material by refrigeration, withdrawing said confection material by said rods from the mold, supporting the confection material upon said rods while finishing it as a plurality of individual frozen confections, and then breaking the bond between the finished confections and their respective rods in one single operation.

JAMES E. HOGUE.